Feb. 1, 1938. U. E. COONS 2,107,053
METHOD OF REFRIGERATION
Filed Oct. 28, 1935  2 Sheets-Sheet 2
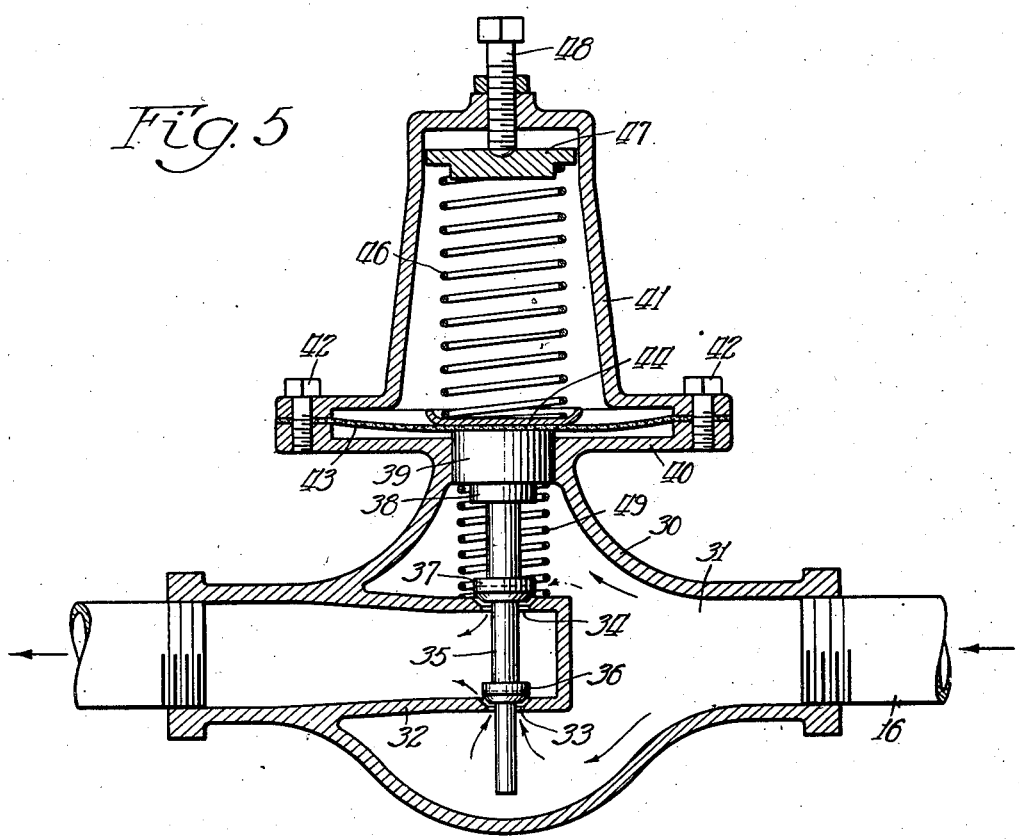
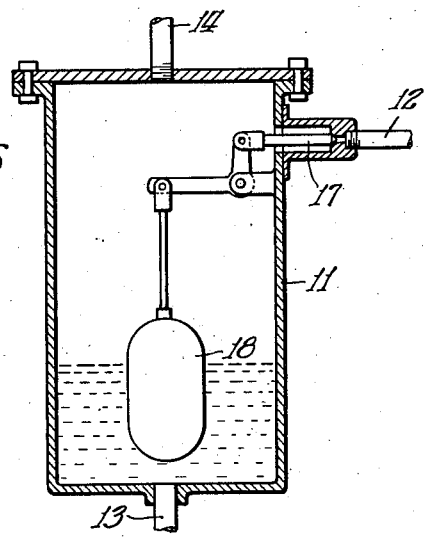
Witness:
V. Siljander
Inventor
Uzal E. Coons
By Ernest E. Tupes
Atty Patented Feb. 1, 1938

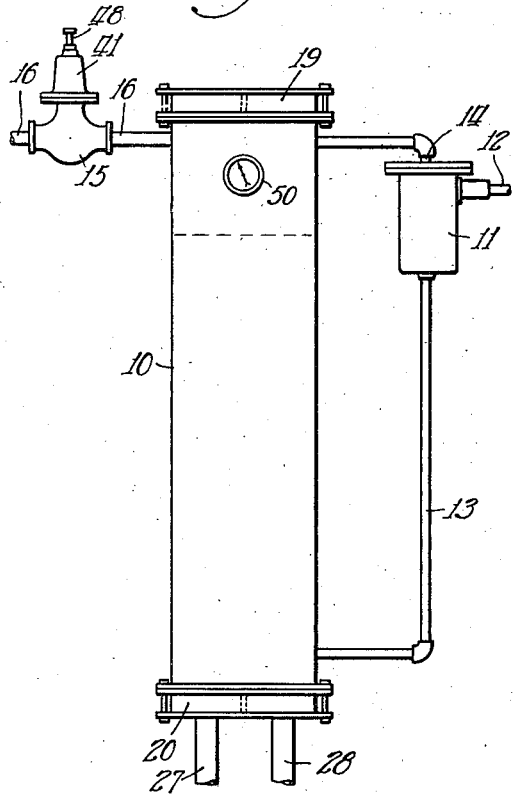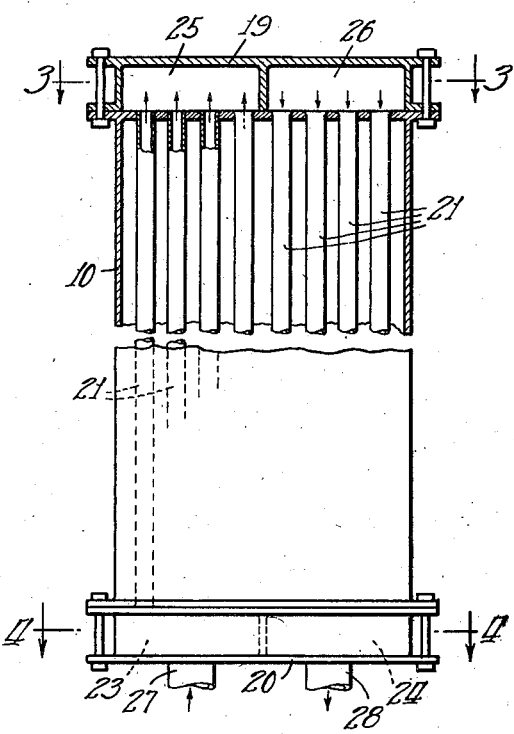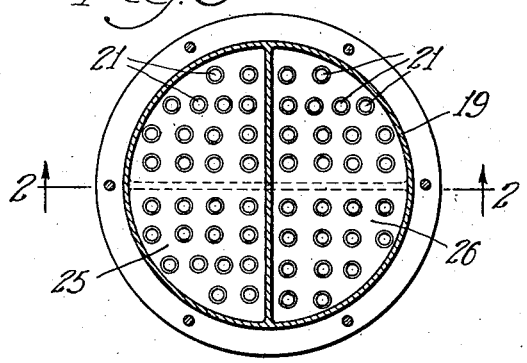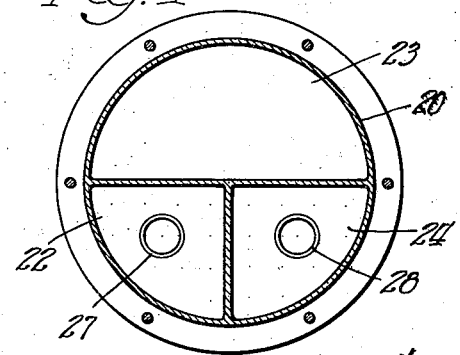

2,107,053

UNITED STATES PATENT OFFICE 2,107,053

METHOD OF REFRIGERATION

Uzal E. Coons, Fort Wayne, Ind., assignor of one-half to Herbert L. Somers, Fort Wayne, Ind.

Application October 28, 1935, Serial No. 47,155

4 Claims. (Cl. 62—177)

The invention relates to refrigerating methods and more particularly it relates to an improved method for cooling liquids below their freezing point without freezing and thereby adapting the liquids for general refrigeration in factories, bakeries, breweries, etc., wherein the cooling liquid is used as a substitute for ice.

It is well-known that the best results are obtained in the preparation of many products having water as a constituent, if the water is introduced at a temperature of 32° F. For example, bakers in many instances desire that water should be introduced into dough mixers at freezing temperature. Since a water cooler must necessarily be positioned at some distance from the mixers, the temperature of the water generally rises approximately two degrees while transferring it to the mixers and if it leaves the cooler at a temperature of 32° F., it has a temperature of approximately 34° F. when entering the mixer. The desired temperature has hitherto been obtained by adding sufficient crushed ice to the mixer to cool the liquid content of the dough to approximately 32° F. The lowering of the temperature of the dough by the addition of ice is time-consuming and has other disadvantages well known to the art and which it is an object of the invention to eliminate.

Another object of the invention is the provision of a novel method of cooling water to a temperature below 32° F. without permitting it to freeze and to make it available for transmission and for delivery in liquid form where its use requires a temperature of 32° F. or lower.

Many other objects and advantages of the invention herein shown and described will be obvious to those skilled in the art from the disclosures herein given.

To this end my invention consists in the novel method of cooling liquids below their freezing point and particularly consists of a method of cooling water below its freezing point for the purposes above described.

Referring now to the drawings:

Fig. 1 is an elevational diagrammatic view of apparatus used in practicing the invention;

Fig. 2 is a view partially in section of a refrigerant container and headers forming part of the apparatus shown in Fig. 1;

Fig. 3 is a sectional view along the line 3—3 of Fig. 2;

Fig. 4 is a sectional view along the line 4—4 of Fig. 2;

Fig. 5 is a sectional view of a pressure regulating valve utilized in practicing the invention; and Fig. 6 is a sectional view through a float chamber illustrating a needle valve controlling the flow of refrigerant into the container.

Referring now more particularly to the drawings, the apparatus is shown as comprising a refrigerant container 10, a float chamber 11, a pipe 12 for delivering fluid refrigerant into the chamber, and a pipe 13 connecting the chamber with the lower portion of the container. A pipe 14 provides a by-pass connecting the chamber 11 with the upper portion of the container 10.

The pipe 12 is connected with a source of supply of any suitable working refrigerant such as ammonia, sulphur dioxide, freon and similar substances. The apparatus is described as used with ammonia, but it is to be understood that it is also adapted for use with any of the above named refrigerants as well as others by adjusting a sensitive pressure regulating valve 15, positioned in a discharge pipe 16 connected with the top of the container 10.

The discharge pipe 16 is connected with a compressor which delivers the vapors coming from the valve 15 into a condenser where they are liquefied by cooling and are returned to the float chamber 11. Illustration or further description of the compressor and the condenser are omitted as being unnecessary to an understanding of the invention.

Admission of liquid refrigerant into the chamber 11 is controlled by a needle valve 17 actuated by a float 18 as shown. The liquid refrigerant is vaporized within the container 10, and escapes through the valve 15 which is adjusted to open and close between selected narrow limits of vapor pressure. The operation of the device is hereinafter described as adapted to cool water to temperatures as low as thirty degrees Fahrenheit without the formation of ice.

The container 10 is shown as cylindrical with its ends closed by upper and lower headers 19 and 20 respectively. A plurality of fluid passages or tubes 21, positioned within the container 10, connect the headers 19 and 20 and permit the circulation therethrough of fluids to be cooled. The lower header 20 is divided by suitable partitions into chambers 22, 23 and 24 and the upper header 19 is similarly divided into chambers 25 and 26. An inlet pipe 27 delivers water or other liquids or fluids to be cooled into the chamber 22, hereinafter designated as the inlet chamber. An outlet pipe 28, connected with the chamber 24, hereinafter designated as the outlet or discharge chamber, discharges the water or fluid from the header 20 after it has been cooled by circulation through the passages 21. The tubes or passages 21 are so arranged that the water delivered to the container 10 through the pipe 27 completes a number of passes through the container before it enters the outlet chamber 24 and is finally discharged through the pipe 28. The first pass of the water through the container 10 is through a group of tubes 21 connecting the inlet chamber 22 in the lower header with the chamber 25 in the upper header and the second pass is through a group of tubes connecting the chamber 25 with the chamber 23 in the lower header. The third pass is through another group of tubes 21 connecting the chamber 23 with the chamber 26 in the upper header and the fourth pass is through still another group of tubes 21 connecting the chamber 26 with the outlet chamber 24.

The latent heat of vaporization of the ammonia refrigerant surrounding the tubes 21 is taken from the water which is circulated through the tubes 21 at a rate such that the water is cooled slightly below the freezing point without the formation of ice in the tubes. The velocity of the water is accelerated as it approaches the freezing point by having the total cross-sectional area of the tubes 21, forming the final passes, less than the cross-sectional area of the tubes forming the initial passes. In the drawings this feature is illustrated by providing fewer tubes 21 in the final pass from the chamber 26 to the discharge chamber 24 than are provided in the preceding passes. The acceleration of the velocity in the final passes may also be accomplished by providing tubes of smaller diameter for the later passes. However, the expense of construction is generally less if tubes of the same diameter are used in all the passes and the desired successively accelerated velocities are obtained by providing fewer tubes in the later passes. The water thus lowered to the freezing point or slightly below by successive passes through the container 10, is conducted by the pipe 28 throughout the plant where it is available for consumption or utilized for cooling and again returned through the pipe 27 for circulation through the container by any suitable means such as a motor actuated pump, not shown.

Efficiency and economy of operation is not possible if thin layers of ice separate the water from the refrigerant as is frequently the case if the cooling is accomplished by passing the refrigerant through coils surrounded by the water to be cooled. The described circulation of water through the container 10 in successive passes surrounded by refrigerant, the vaporization of which is controlled by the sensitive pressure regulating valve 15 as hereinafter described, enables the water to be cooled to the freezing point and below without the formation of ice.

Control of the temperature to which the water is lowered in the container 10 is accomplished by so regulating the rate of vaporization within the container that the latent heat requirements for vaporization of the refrigerant are supplied by the water and the temperature of the water is thereby lowered to the desired point. The rate of vaporization necessary to cool the water to the desired temperature depends upon various factors such as the initial temperature of the water, its velocity and its total length of travel in the container. The rate of vaporization of the refrigerant is a function both of its pressure and temperature and since economy of operation makes it desirable that the heat given off by the water in cooling equals the latent heat of vaporization of the refrigerant, the pressure regulating valve 15 is so constructed as to automatically control the rate of vaporization of the refrigerant in a manner whereby its latent heat requirements are supplied by the water or other fluid in reducing the temperature of the latter to any selected or predetermined point.

The valve 15 comprises a body 30 providing a chamber 31 into which the vaporized refrigerant enters through the initial pipe section 16, and a member providing a conduit 32 projecting into the chamber and opening into the main pipe 16. The inner end of the conduit 32 is closed and provided with ports 33 and 34 respectively positioned in alignment on opposite sides of the conduit. The ports 33 and 34 provide the only means of egress of vapor from the container 10 through the chamber 31 and into the main discharge pipe 16. The valve 15 is made responsive to slight changes in vapor pressure by providing a valve stem, generally designated by the numeral 35. The stem 35 extends through the ports 33 and 34 and is provided with collars 36 and 37 adapted to be seated upon the conduit 32 and to respectively close the ports 33 and 34. The upper end of the stem 35 is enlarged to provide contiguous shouldered portions 38 and 39, the outer portion 39 being of larger diameter than the portion 38 and slidably fitting in and projecting through an aperture in the valve body 30. A flange 40 on the body 30 surrounds the projecting portion 39 of the stem 35 and provides a seat for a housing 41. The housing 41 is fastened to the flange 40 by bolts 42. A diaphragm plate 43, clamped between the flange 40 and the housing 41, provides a seal preventing escape of vapors from the chamber 31 through the housing. A plate 44, seated upon the diaphragm 43, provides an abutment for the lower end of a spring 46 and a movable plate 47 similarly provides an abutment for the upper end of the spring.

A bolt 48, threaded through the housing 41 into contact with the plate 47 maintains the plate in a position wherein the spring 45 holds the diaphragm 43 constantly in contact with the adjacent end of the valve stem 35.

The port 34 and the collar 37 are respectively of larger diameter than the port 33 and the collar 36. When the stem 35 is in its dotted line or closed position of the ports, the total vapor pressure exerted on the collar 37 and tending to hold the stem in closed position is greater than the total vapor pressure exerted on the collar 36 tending to move the stem to open position. The pressure of the vapor upon the lateral areas of the shouldered portions 38 and 39 also tends to move the stem 35 to open position and since the combined total effective areas of the collar 36 and of the shouldered portions 38 and 39 is greater than that of the corresponding area of the collar 37, the vapor pressure within the valve body always tends to move the stem 35 to open position against the resistance offered by the spring 46.

The valve 15 is made sensitive to slight changes in vapor pressure by providing a compression spring 49 having its ends respectively abutting the conduit 32 and the shouldered portion 38, whereby the spring also tends to maintain the valve stem 35 in open position. The bolt 48 is operable to vary the resistance offered by the spring 46 to the movement of the stem 35 to open position under the action of the spring 49 and the vapors present in the valve body. By setting the bolt 48 so that the spring 46 will yield to permit the valve 35 to move to wide open position under the force exerted thereon by the spring 49 supplemented by a selected maximum vapor pressure in the chamber 31 and the container 10, the valve will remain wide open for all vapor pressures at and above such selected maximum.

The resistance of the spring 49 is such that it holds the valve 35 in partially open position for vapor pressures less than such selected maximum and permits complete closure of the valve only when there is little or no vapor pressure. For all vapor pressures less than said selected maximum other than extremely low negligible pressures, the spring 49 holds the valve in partially open position corresponding to the rate of vaporization and thereby holds the vapor pressure within a narrow range slightly less than the selected maximum pressure determined by the setting of the bolt 48 to adjust the closing force of the spring 46. As a result, the valve 35 is never entirely closed during the operation and is open sufficiently to permit vaporization at varying rates and at substantially constant vapor pressures within a range slightly below the selected maximum pressure. Obviously, the valve 15 is adjustable to operate as described at any selected maximum vapor pressure and to remain open in various amounts in accordance with the refrigerating requirements of the fluid passing through the passages 21 in the container 10.

The needle valve 17 is maintained closed as shown by the float 18 when the liquid refrigerant is at the indicated level. This level will vary with the capacity of the container and its relative lateral and longitudinal dimensions. For a container of the relative dimensions shown, it is found satisfactory to have the vapor space approximately equal to one-eighth of the volume of liquid refrigerant. The valve 17 opens automatically to permit flow of liquid refrigerant from the pipe 12 in sufficient quantities to maintain the level shown.

Saturated ammonia has an absolute pressure of slightly less than sixty pounds per square inch at a temperature of thirty degrees Fahrenheit, an absolute pressure of sixty-two and three-tenths pounds per square inch at a temperature of thirty-two degrees Fahrenheit, and an absolute pressure of sixty-five pounds per square inch at a temperature of thirty-four degrees Fahrenheit. Assuming that it is desired to cool water to a temperature of thirty degrees Fahrenheit, using ammonia as a refrigerant, operation of the device is started with a trial setting of the bolt 48 and the pressure reading of the refrigerant is obtained from a gauge 50. The valve 15 is then adjusted by actuation of the bolt 48 until the reading of the gauge 50 indicates a pressure corresponding approximately to that of an absolute pressure of sixty pounds per square inch within the container. Vaporization of the ammonia will then proceed and be discharged by the valve 15 at a rate varying with the initial temperature and velocity of the water, and the water will be cooled to thirty degrees Fahrenheit.

Thus it will be seen that I have provided an improved refrigerating apparatus adapted to be set to operate automatically in accordance with varying demands and to maintain refrigerant vapor pressures within a narrow range slightly less than a selected maximum whereby water may be cooled to thirty degrees Fahrenheit without freezing and the temperature of any fluid fluctuating in volume and initial temperatures may be lowered to a selected temperature and wherein the refrigerant vapor pressure is maintained substantially constant by a novel pressure regulating valve.

Having thus described my invention, it is obvious that various immaterial modifications may be made in the same without departing from the spirit of my invention; hence I do not wish to be understood as limiting myself to the exact form, construction, arrangement and combination of parts herein shown and described or uses mentioned.

What I claim as new and desire to secure by Letters Patent is:

1. In the refrigerating art the method of cooling water below 32° F. without freezing, which consists in maintaining a body of refrigerant at a substantially constant pressure corresponding to a temperature slightly less than the desired minimum temperature of the water, causing the water to flow in a confined stream in close heat exchange proximity to said refrigerant until it is lowered to the desired temperature and accelerating the velocity of the water as its temperature is lowered, the accelerated velocity being such that the water reaches the desired minimum temperature without freezing.

2. In the refrigerating art the method of maintaining a supply of fluid at a selected temperature below its freezing point which consists in providing a body of refrigerant and maintaining said refrigerant at a substantially constant pressure corresponding to a temperature slightly less than the desired temperature of the fluid, causing the fluid to flow as a confined stream back and forth through the refrigerant in close heat exchange proximity to and out of direct contact therewith, and increasing the velocity of the fluid before reaching its freezing point to a rate such that the fluid reaches the desired minimum temperature without freezing.

3. A method of reducing water to a selected temperature slightly below 32° F. which consists in causing the water to flow in heat exchange proximity to a confined body of refrigerant, maintaining the refrigerant within a narrow range of pressure and corresponding range of temperature by selectively releasing vapors from the refrigerant as its pressure and temperature approach the maximum of said range, the upper limit of said range of refrigerant temperatures being slightly less than the selected temperature to which the water is to be cooled, and accelerating the rate of flow of the water cooled to 32° F. and below, the accelerated rate of flow being such as to prevent the water from freezing.

4. The method of reducing water to a temperature of approximately 30° F without freezing, which consists in causing the water to flow back and forth through and in close heat exchange proximity to a confined body of refrigerant, maintaining the refrigerant within a narrow range of pressure and corresponding temperature by selectively releasing vapors from the refrigerant as its pressure and temperature approach the maximum of said range, the upper limit of said range of refrigerant temperatures being less than 30° F. and accelerating the velocity of the water as it is cooled to 32° F. and below, the accelerated velocity being such that the water reaches a temperature of 30° F. without freezing.

UZAL E. COONS.